United States Patent
Pham et al.

(10) Patent No.: US 6,950,863 B1
(45) Date of Patent: Sep. 27, 2005

(54) METHOD AND SYSTEM FOR VERIFYING A SOFTWARE UPGRADE FOR A COMMUNICATION DEVICE

(75) Inventors: Duc M. Pham, San Jose, CA (US); Hang Zhang, San Jose, CA (US)

(73) Assignee: Cisco Technology, Inc., San Jose, CA (US)

( * ) Notice: Subject to any disclaimer, the term of this patent is extended or adjusted under 35 U.S.C. 154(b) by 824 days.

(21) Appl. No.: 09/746,301

(22) Filed: Dec. 21, 2000

(51) Int. Cl.⁷ ............................................. G06F 15/177
(52) U.S. Cl. ..................... 709/221; 709/220; 713/1; 713/2; 713/100; 717/168; 717/171
(58) Field of Search ................. 709/220, 221, 709/228; 710/8; 713/1, 2, 100; 717/124, 717/126, 168–178

(56) References Cited

U.S. PATENT DOCUMENTS

| | | | |
|---|---|---|---|
| 5,835,911 A * | 11/1998 | Nakagawa et al. ......... 707/203 |
| 5,845,077 A * | 12/1998 | Fawcett ....................... 709/221 |
| 5,974,454 A * | 10/1999 | Apfel et al. .................. 709/221 |
| 6,282,709 B1 | 8/2001 | Reha et al. .................... 717/11 |
| 6,332,217 B1 | 12/2001 | Hastings ...................... 717/11 |
| 6,347,398 B1 | 2/2002 | Parthasarathy et al. ....... 717/11 |
| 6,381,741 B1 * | 4/2002 | Shaw .......................... 717/168 |
| 6,381,742 B2 | 4/2002 | Forbes et al. ................. 717/11 |
| 6,553,507 B1 | 4/2003 | Cohen ............................ 714/4 |
| 6,557,054 B2 | 4/2003 | Reisman ...................... 710/33 |
| 6,578,142 B1 | 6/2003 | Anderson et al. .............. 713/2 |
| 6,578,199 B1 | 6/2003 | Tsou et al. ................... 717/178 |
| 6,694,335 B1 * | 2/2004 | Hopmann et al. ........... 707/201 |

FOREIGN PATENT DOCUMENTS

WO     WO0190892 A1 * 11/2001    ........... G06F 9/445

* cited by examiner

*Primary Examiner*—Jeffrey Gaffin
*Assistant Examiner*—Eron Sorrell
(74) *Attorney, Agent, or Firm*—Baker Botts L.L.P.

(57) ABSTRACT

A method and apparatus for verifying a software upgrade for a communication device identifies transient variables that may change their value over time. These transient variables are then compared to change variables produced by different versions of software to verify the upgrade.

19 Claims, 3 Drawing Sheets

| | VARIABLE NAME | FIRST COPY | SECOND COPY | SECOND VARIABLE SET | TRANSIENT VARIABLES | CHANGED VARIABLES | REMAINDER |
|---|---|---|---|---|---|---|---|
| 210 → | VAR1 | "OC-3" | "OC-3" | "OC-3" | – | – | – |
| 212 → | SYSUPTIME | 121348 | 121408 | 121448 | 60 | 100 | 40 |
| | VAR27 | 23 | 23 | 23 | – | – | – |
| 214 → | PKT_CT | 137 | 146 | 152 | 9 | 15 | 6 |
| 216 → | VAR13 | ✕ | ✕ | 13.4 | – | 13.4 | 13.4 |
| 218 → | VAR88 | FLAG 1 | FLAG 1 | ✕ | – | FLAG 1 | FLAG 1 |
| 220 → | VAR33 | A62.B | A62.B | C4.A | – | <diff> | <diff> |
| | ⋮ | ⋮ | ⋮ | ⋮ | ⋮ | ⋮ | ⋮ |

METHOD AND SYSTEM FOR VERIFYING A SOFTWARE UPGRADE FOR A COMMUNICATION DEVICE

TECHNICAL FIELD OF THE INVENTION

This invention relates generally to the field of communications, and more particularly to a method and system for verifying a software upgrade for a communication device.

BACKGROUND OF THE INVENTION

Communication devices, such as routers, hubs, switches, and end-user devices, execute software to perform their functions. The software manages the overall operation of the device to deliver communication services, and may also provide a variety of provisioning, configuration, and management functions. To ensure the reliability and maintenance of these communication devices, the software often maintains a number of variables in a managed information base (MIB) to monitor and manage the communication device.

Software in these communication devices will invariably require upgrades, in whole or in part, to improve the functionality of the device, to fix software bugs and errors, or to improve the device's overall operation and performance. With increasingly more complex communication devices provisioned in networks of many interdependent devices, device manufacturers and network administrators must ensure that software upgrades are performed expeditiously and accurately to minimize device errors and interruption in network services.

SUMMARY OF THE INVENTION

The present invention solves many of the problems and disadvantages associated with prior communication systems. In a particular embodiment, the present invention provides a method and system for verifying a software upgrade of a communication device.

In a particular embodiment, a method for verifying a software upgrade for a communication device includes determining transient variables maintained by the communication device executing first software. The method compares a first variable set maintained by the communication device executing first software to a second variable set maintained by the communication device executing second software to identify changed variables. The method indicates a failure of the verification if at least one of the changed variables does not match one of the transient variables.

In another embodiment of the present invention, a software upgrade verification system includes an interface operable to couple to a communication device and a processor coupled to the interface that determines transient variables maintained by the communication device executing first software. The processor compares a first variable set maintained by the communication device executing first software to a second variable set maintained by the communication device executing second software to identify changed variables. The process indicates the failure of a software upgrade verification if at least one of the changed variables does not match one of the transient variables.

Technical advantages of certain embodiments of the present invention include the ability to verify a software upgrade using variable sets maintained by the communication device. This software verification technique leverages the fact that software upgrades may enhance features and functionality of the device, but a set or subset of variables maintained to operate and manage the communication device remain the same. In a particular embodiment, two copies of variable sets maintained by the communication device executing first software identify transient variables that have allowable or expected changes in value over time. A comparison between a variable set maintained by the communication device executing first software and a variable set maintained by the communication device executing a second software may then identify any changed variables. If any of the changed variables do not match a previously identified transient variable, then the verification fails.

Other technical advantages of certain embodiments of the present invention include performing the software verification either locally at a central network location before releasing the upgraded software, or remotely on provisioned communication devices. The system may perform the verification many times to confirm that the new software is operating properly through a variety of conditions and states of the communication device. Furthermore, the software verification may be performed using a variety of management protocols, including simple network management protocol (SNMP), a browser-based system using hypertext transfer protocol (HTTP), or any other in-band or out-of-band technique to query and retrieve variables maintained by a communication device. Other technical advantages will be readily apparent to one skilled in the art from the following figures, descriptions, and claims.

BRIEF DESCRIPTION OF THE DRAWINGS

For a more complete understanding of the present invention and its advantages, reference is now made to the following description, taken in conjunction with the accompanying drawings, in which.

DETAILED DESCRIPTION OF THE INVENTION

Figure 1:
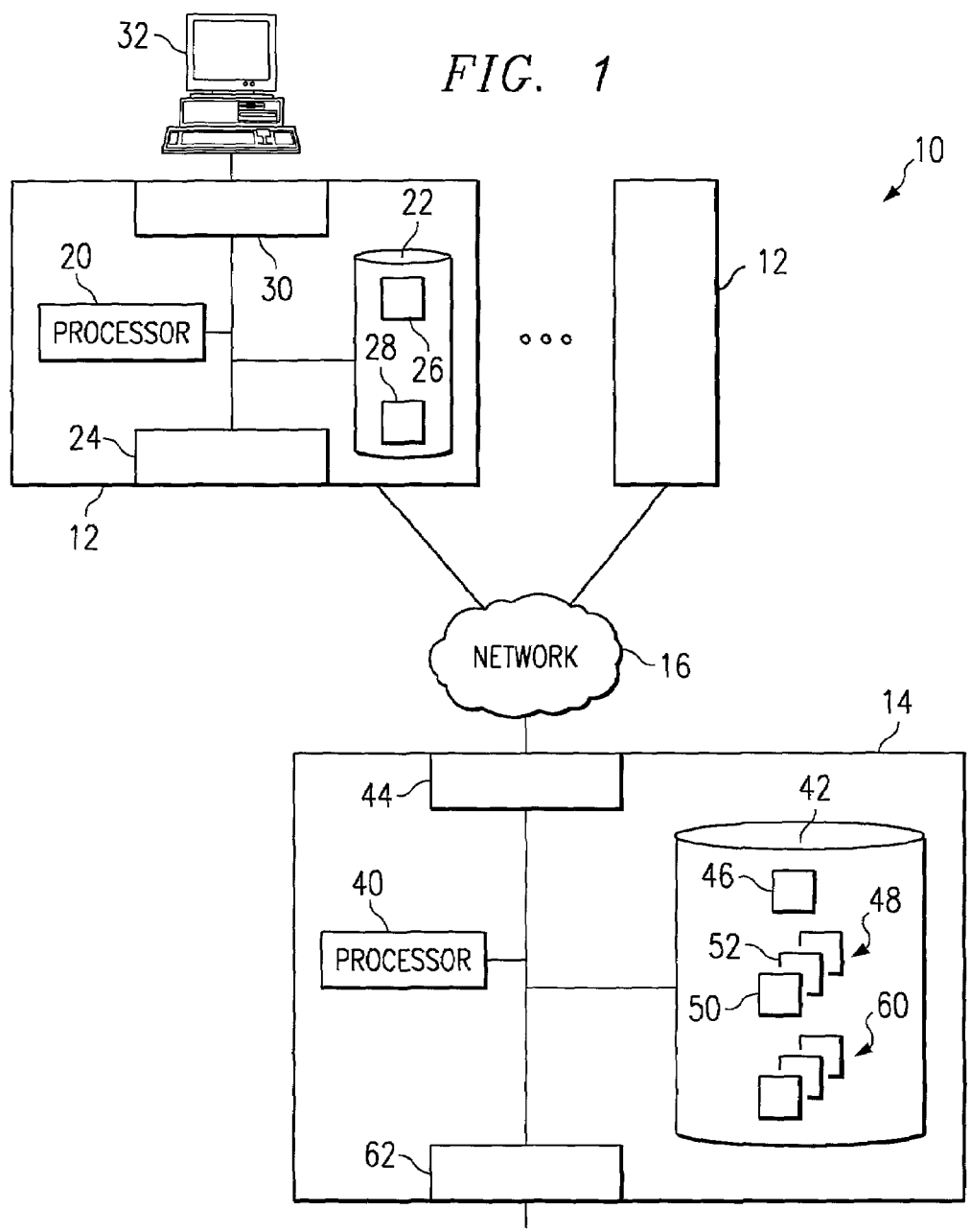
FIG. 1 illustrates one embodiment of a communication system incorporating teachings of the present invention.

FIG. 1 illustrates a communication system 10 that includes one or more communication devices 12 coupled to server 14 using network 16. Server 14 performs a variety of variable processing techniques to verify software upgrades for communication devices 12.

Communication devices 12 may be hubs, routers, switches, end-user devices, or any other device or component that performs communication and/or processing functions in system 10. Each communication device 12 includes a processor 20, memory 22, and interface 24. Processor 20 may be a controller, microprocessor, digital signal processor (DSP), or other suitable computing component that executes software 26 maintained in memory 22 to control the overall operation and functions of communication device 12. Software 26 includes any form or arrangement of code, software, program instructions, data, or other information in machine-readable or human-readable format (generally referred to as software) executed by processor 20 to perform features and functions of communication device 12. Interface 24 provides communication of voice, video, data and/or other information between communication device 12 and network 16. Communication device 12 may also include another local interface 30 that allows a user operating terminal 32 to provision, configure, manage, and/or control the operation of communication device 12.

Memory 22 is any suitable integral or distributed, volatile or non-volatile memory that maintains variables 28 that specify the configuration, provisioning, condition, and/or state of communication device 12. In one embodiment, variables 28 may be a selected portion or all of a managed information base (MIB) associated with communication device 12. Variables 28 allow provisioning and management of communication device 12. In one embodiment, terminal 32 can get and set values of variables 28 using, for example, a browser-based interface that supports hypertext transfer protocol (HTTP) or other similar protocol. In addition, communication device 12 may support remote provisioning and network management through any variety of in-band and/or out-of-band protocols using network 16. For example, simple network management protocol (SNMP), a browser-based protocol such as HTTP, Web-based Enterprise Management (WBEM), Common Management Information Protocol (CMIP), remote monitoring (RMON), or other suitable protocol allows other components in system 10, such as server 14, to get and set variables 28 to manage the operation of communication device 12. One technical advantage of system 10 is the use of these existing management and provisioning protocols to provide software upgrade verification for communication device 12.

Server 14 includes a processor 40, a memory 42, and an interface 44. Processor 40 may be a controller, microprocessor, digital signal processor (DSP), or other suitable computing component that executes software 46 maintained in memory 44 to control the overall operation and functions of server 14. Interface 44 allows server 14 to communicate with communication devices 12 using network 16. Server 14 also includes an interface 62 that couples to or allows server 14 to couple to any number of input devices, such as a keyboard, mouse, microphone or other appropriate input device, as well as output devices, such as a display, speaker, or other appropriate output device. Interface 62 allows a user to interact with server 14, upload new versions of software for communication devices 12, and initiate software upgrade verification procedures for communication devices 12.

Figures 2, 3:
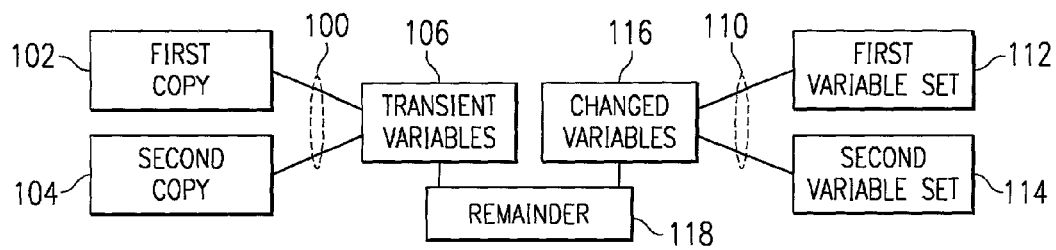
FIG. 2 illustrates a schematic representation of variable processing to verify software upgrades in the communication system.
FIG. 3 is a table illustrating a variety of files used in the variable processing.

Memory 42 is any integral or distributed, volatile or non-volatile memory that maintains different versions of software 48 that can be downloaded and executed by devices 12. Software 48 contemplates at least a first software 50 representing the current version of software 26 executed by communication device 12, and a second software 52 representing the upgraded version of software intended for communication device 12. Second software 52 contemplates a complete upgrade, partial upgrade, patch, bug fix, or other partial or full new component of software for communication device 12. Software 48 generally contemplates any number and arrangement of versions of software for execution by a variety of devices 12. Memory 42 also maintains variable files 60 that allow server 14 to verify software upgrades for communication devices 12. FIGS. 2 and 3 describe in more detail the content and use of variable files 60.

Network 16 may be a local area network (LAN), wide area network (WAN), a global distributed network such as the Internet, or any other suitable wireline or wireless network. In a particular embodiment, network 16 couples server 14 to a variety of devices 12 at a central network location for performing software upgrade verification procedures. In another embodiment, network 16 represents components that allow server 14 to couple to devices 12 that are already provisioned and providing communication services. Network 16 contemplates any suitable form of hardware and/or software to support any suitable communication protocol, network management protocol, or other communication technique. In a particular embodiment, network 16 comprises a packet network that communicates voice, video, data, and/or other information in packets, cells, or other segments of information (generally referred to as packets).

In operation, server 14 maintains or receives new versions of software 48 for upgrading communication devices 12. Server 14 retrieves variables 28 from communication device 12 executing first software 50 using an appropriate management protocol. In a particular embodiment, server 14 receives a first copy and a second copy of variables 28 to identify transient variables that may change their value over time. Server 14 communicates second software 52 to communication device 12. Again using network management protocols, server 14 retrieves variables 28 resulting from execution of second software 52, and compares these variables to previously stored variables maintained by communication device 12 executing first software 50. If any of the changed variables do not match transient variables, then server 14 declares a software upgrade verification failure. The operations of server 14 may be performed wholly or partially using software, firmware, or other logic encoded media.

FIG. 2 is a schematic illustration of variable files 60 used by server 14 to perform the software upgrade verification. Each of the elements in FIG. 2 represents a file, table, or other suitable arrangement of all or a selected portion of variables 28 maintained by communication device 12.

To verify a software upgrade, server 14 performs two comparisons. A first comparison 100 compares a first copy 102 of variables 28 maintained by communication device 12 executing first software 50 to a second copy 104 of variables 28 maintained by communication device 12 executing first software 50. Comparison 100 then yields variables that have changed values over time, as indicated by transient variables 106. Transient variables 106 may include system time, packet count, counters, and other variables that change values during normal operation of communication device 12. A second comparison 110 compares a first variable set 112 maintained by communication device 12 executing first software 50 to a second variable set 114 maintained by communication device 12 after loading and executing second software 52. Comparison 110 generates a list of changed variables 116 that identify any new variables, different variables, or variables that have changed values.

Upon establishing transient variables 106 and changed variables 116, server 14 then determines if each changed variable 116 matches at least one transient variable 106. For each changed variable 116 that matches transient variable 106, server 14 reconciles the difference between first variable set 112 and second variable set 114 as an expected change over time in the particular transient variable 106. Remainder 118 represents any changed variables 116 that do not match transient variables 106. If the managed information based (MIB) changes between first software 50 and second software 52, remainder 118 may also include any new or changed variables. Server 14 may then reconcile these variables in remainder 118 to determine if second software 52 is compatible.

In a particular embodiment where all or a selected portion of the MIB of communication device 12 does not change, server 14 declares a failure of the software upgrade verification if at least one changed variable 116 does not appear in transient variables 106. This failure may be caused by a mismatch between first variable set 112 and second variable set 114, which indicates an unexpected change in, for example, the MIB of communication device 12. This mismatch encourages further investigation as to the compatibility of second software 52. The failure may also be caused by a variable in remainder 118 that is not transient that unexpectedly changes its value. Again, this may reflect underlying compatibility issues between first software 50 and second software 52. In any of these scenarios, a failure in the software verification procedure results in the generation of a remainder 118 that server 14 analyzes to ameliorate a software compatibility issue.

FIG. 3 illustrates table 200 that illustrates one embodiment for organizing variable files 60 at server 14. Table 200 is merely illustrative, and system 10 contemplates any organization or arrangement of variable files 60 to perform the appropriate comparisons for software upgrade verification.

Each row or entry in table 200 specifies a variable name 202 and the numeric, alphanumeric, textual, or other values of the variable name in associated files 60. For example, entry 210 specifies variable "VAR1" that has a value of "OC-3" in first copy 102, second copy 104, and second variable set 114. As a result, "VAR1" is not listed as either a transient variable 106 or a changed variable 116. Entry 212 specifies variable "SYSUPTIME" that includes a different value in first copy 102, second copy 104, and second variable set 114. As a result, "SYSUPTIME" and/or its value appears in transient variables 106 and change variables 116. Although entry 212 specifies the value in transient variables 106 and change variables 116 as a numerical difference, table 200 contemplates any value or indication to show a change in the value of the variables "SYSUPTIME". Entry 214 illustrates the variable "PKT_CT", which is similar to "SYSUPTIME" in entry 212 and appears in transient variables 106 and change variables 116. In a particular embodiment, entries 210, 212, and 214 would not trigger a failure in the software upgrade verification. Entry 210 does not change, and entries 212 and 214 reflect transient variables 106 with expected changes in their value over time.

Entry 216 specifies values for variable "VAR13", which indicates that this variable does not appear in either first copy 102 or second copy 104, but later appears in second variable set 114. In this case "VAR13" is not listed in transient variables 106, but appears as a changed variable 116. This addition of a new variable may result in failure of the software upgrade verification. Similarly, entry 218 specifies variable "VAR88" that appears in first copy 102 and second copy 104, but does not appear in second variable set 114. This omission of "VAR88" may also trigger a failure of the software upgrade verification. Entry 220 specifies another variable "VAR33" which has the same value in first copy 102 and second copy 104, but changes value in second variable set 114. Server 14, therefore, classifies "VAR33" as a changed variable 116, but not a transient variable 106. This discrepancy of a variable that has a value in changed variables 116 and not a corresponding value in transient variables 106 may cause a failure in the software upgrade verification.

Figure 4:
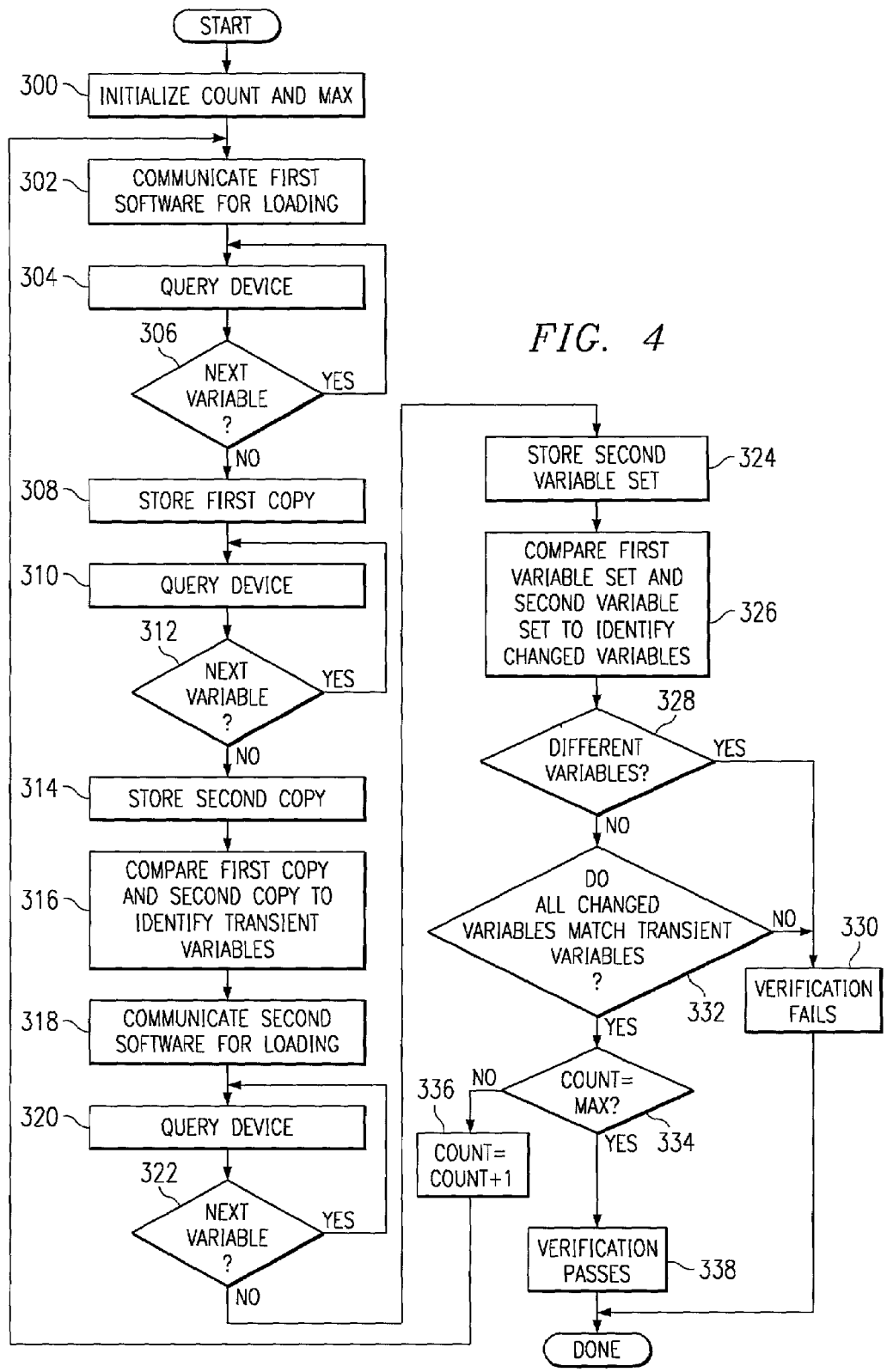
FIG. 4 is a flowchart of a method for verifying software upgrades.

FIG. 4 is a flowchart of a method for performing the software upgrade verification. The method begins at step 300 where server 14 initializes a verification cycle count and maximum count. Server 14 uses the verification cycle count and maximum count to perform the software upgrade verification many times to confirm that second software 52 is operating properly through a variety of conditions and states of communication device 12. Server 14 communicates first software 50 for loading in communication device 12 at step 302. Alternatively, communication device 12 may already execute first software 50 prior to initiation of the verification process. The method contemplates performing the software verification process locally at a central network location before releasing the upgraded software to devices 12 in system 10, or remotely on provisioned devices 12.

Server 14 queries device 12 at step 304 to retrieve a variable value for one of variables 28. If there is a next variable to retrieve as determined at step 306, then server 14 queries device 12 again for the next variable value. This process continues until server 14 retrieves all or a designated portion of variables 28 from device 12, and stores this information as first copy 102 at step 308. This process repeats at steps 310, 312, and 314 in a similar manner to generate and store second copy 104 of variables 28 maintained by communication device 12 executing first software 50. Server 14 compares first copy 102 and second copy 104 to identify transient variables 106 at step 316.

Server 14 communicates second software 52 to communication device 12 for loading and execution at step 318. Second software 52 represents a complete software upgrade, a bug fix, a patch, or any other partial or full software enhancement or upgrade for communication device 12. Server 14 queries communication device 12 for a first value for one of variables 28 at step 320 and, if a next variable is available as determined at step 322, continues to query device 12. Upon receiving values for all or a designated portion of variables 28, server 14 stores this information in second variable set 114 at step 324. Server 14 compares first variable set 112 (e.g., first copy 102 or second copy 104) and second variable set 114 to identify changed variables 116 at step 326.

If server 14 determines that there are any different and unaccounted for variables between first variable set 112 and second variable set 114, as determined at step 328, then the verification fails at step 330 and the method ends. For example, if the MIB of communication device 12 does not change, then any different variables may suggest a software incompatibility. Alternatively, a change in the MIB may allow server 14 to account for expected, different variables at step 328. If there are no different and unaccounted for variables as determined at step 328, then server 14 determines if all changed variables 116 match with transient variables 106 at step 332. If all variables match, which indicates the only different variables between first variable set 112 and second variable set 114 are transient variables 106, then server 14 determines if the verification cycle count equals the maximum count at step 334. If the count does not equal the maximum count, then the count is incremented at step 336 and the process repeated beginning at step 302. If the count equals the maximum count as determined at step 334, then the verification passes at step 338 and the method ends.

Although the present invention has been described with several embodiments, a myriad of changes, variations, alterations, transformations, and modifications may be suggested to one skilled in the art, and it is intended that the present invention encompass such changes, variations, alterations, transformations, and modifications as fall within the scope of the appended claims.

What is claimed is:

1. A method for verifying a software upgrade for a communication device, comprising:

determining a plurality of transient variables maintained by a communication device executing first software;
comparing a first variable set maintained by the communication device executing first software to a second variable set maintained by the communication device executing second software to identify changed variables, wherein the step of comparing further comprises:
loading the communication device with the first software;
determining the first variable set;
loading the communication device with the second software;
determining the second variable set; and
comparing the first variable set to the second variable set to identify the changed variables; and
indicating a failure of the verification if at least one of the changed variables does not match one of the transient variables, wherein the step of determining a plurality of transient variables further comprises:
determining a first copy of a variable set maintained by the communication device executing first software;
determining a second copy of the variable set maintained by the communication device executing first software; and
comparing the first copy to the second copy to identify the transient variables.

2. The method of claim 1, further comprising:
repeating the steps of determining, comparing, and indicating for a predetermined number of counts; and
indicating a pass of the verification if a failure has not been indicated after the predetermined number of counts.

3. The method of claim 1, wherein the steps of determining, comparing, and indicating are performed by a software management system remotely coupled to the communication device using a packet network.

4. The method of claim 1, wherein the first and second variable sets comprise at least a portion of a managed information base (MIB) maintained by the communication device.

5. The method of claim 1, wherein generating the first variable set comprises:
issuing a query to the communication device for a specified variable;
receiving a value for the specified variable from the communication device; and
repeating the steps of querying and receiving for each variable maintained in the first variable set.

6. A software upgrade verification system, comprising:
an interface operable to couple to a communication device;
a processor coupled to the interface and operable to determine a plurality of transient variables maintained by the communication device executing first software, the processor further operable to compare a first variable set maintained by the communication device executing first software to a second variable set maintained by the communication device executing second software to identify change variables, the processor further operable to indicate a failure of a software upgrade verification if at least one of the changed variables does not match one of the transient variables, wherein the comparison operation comprises:
loading the communication device with the first software;
determining the first variable set;
loading the communication device with the second software;
determining the second variable set; and
comparing the first variable set to the second variable set to identify the changed variables.

7. The system of claim 6, wherein, to determine the transient variables, the processor is further operable to:
determine a first copy of the variable set maintained by the communication device operating first software;
determine a second copy of a variable set maintained by the communication device operating the first software; and
compare the first copy to the second copy to identify the transient variables.

8. The system of claim 6, further comprising a memory operable to store first software and second software, wherein the processor is operable to:
retrieve the first software from the memory;
communicate the first software to the communication device using the interface;
receive the first variable set maintained by the communication device executing the first software using the interface;
retrieve the second software from the memory;
communicate the second software to the communication device using the interface;
receive the second variable set maintained by the communication device executing the second software using the interface; and
compare the first variable set to the second variable set to identify the changed variables.

9. The system of claim 6, wherein the interface is operable to couple to the communication device using a packet network.

10. The system of claim 6, wherein the first and second variable sets comprise at least a portion of a managed information base maintained by the communication device.

11. The system of claim 6, wherein the processor is further operable to:
issue a query to the communication device for a specified variable using the interface;
receive a value of the specified variable from the interface;
store the specified value in the memory; and
repeat the query, receive, and store operations for each of a plurality of variables in the first variable set.

12. Logic encoded in media for verifying a software upgrade for a communication device, the logic operable to perform the following steps:
determining a plurality of transient variables maintained by a communication device executing first software;
comparing a first variable set maintained by the communication device executing first software to a second variable set maintained by the communication device executing second software to identify changed variables; and
indicating a failure of the verification if at least one of the changed variables does not match one of the transient variables, wherein the step of comparing comprises:
loading the communication device with the first software;
determining the first variable set;
loading the communication device with the second software;
determining the second variable set; and
comparing the first variable set to the second variable set to identify changed variables.

13. The logic of claim 12, wherein the step of determining a plurality of transient variables comprises:
   determining a first copy of a variable set maintained by the communication device executing first software;
   determining a second copy of the variable set maintained by the communication device executing first software; and
   comparing the first copy to the second copy to identify the transient variables.

14. The logic of claim 12, further comprising:
   repeating the steps of determining, comparing, and indicating for a predetermined number of counts; and
   indicating a pass of the verification if a failure has not been indicated after the predetermined number of counts.

15. The logic of claim 12, wherein the steps of determining, comparing, and indicating are performed by a software management system remotely coupled to the communication device using a packet network.

16. The logic of claim 12, wherein the first and second variable sets comprise at least a portion of a managed information base (MIB) maintained by the communication device.

17. The logic of claim 12, wherein generating a first variable set comprises:
   issuing a query to the communication device for a specified variable;
   receiving a value for the specified variable from the communication device; and
   repeating the steps of querying and receiving for each variable maintained in the first variable set.

18. An apparatus for verifying a software upgrade for a communication device, comprising:
   means for determining a plurality of transient variables maintained by a communication device executing first software;
   means for comparing a first variable set maintained by the communication device executing first software to a second variable set maintained by the communication device executing second software to identify changed variables; and
   means for indicating a failure of the verification if at least one of the changed variables does not match one of the transient variables, wherein the means for comparing further comprises:
      means for loading the communication device with the first software;
      means for determining the first variable set;
      means for loading the communication device with the second software;
      means for determining the second variable set; and
      means for comparing the first variable set to the second variable set to identify changed variables.

19. The apparatus of claim 18, and further comprising:
   means for determining a first copy of a variable set maintained by the communication device executing first software;
   means for determining a second copy of the variable set maintained by the communication device executing first software; and
   means for comparing the first copy to the second copy to identify transient variables.

* * * * *